UNITED STATES PATENT OFFICE.

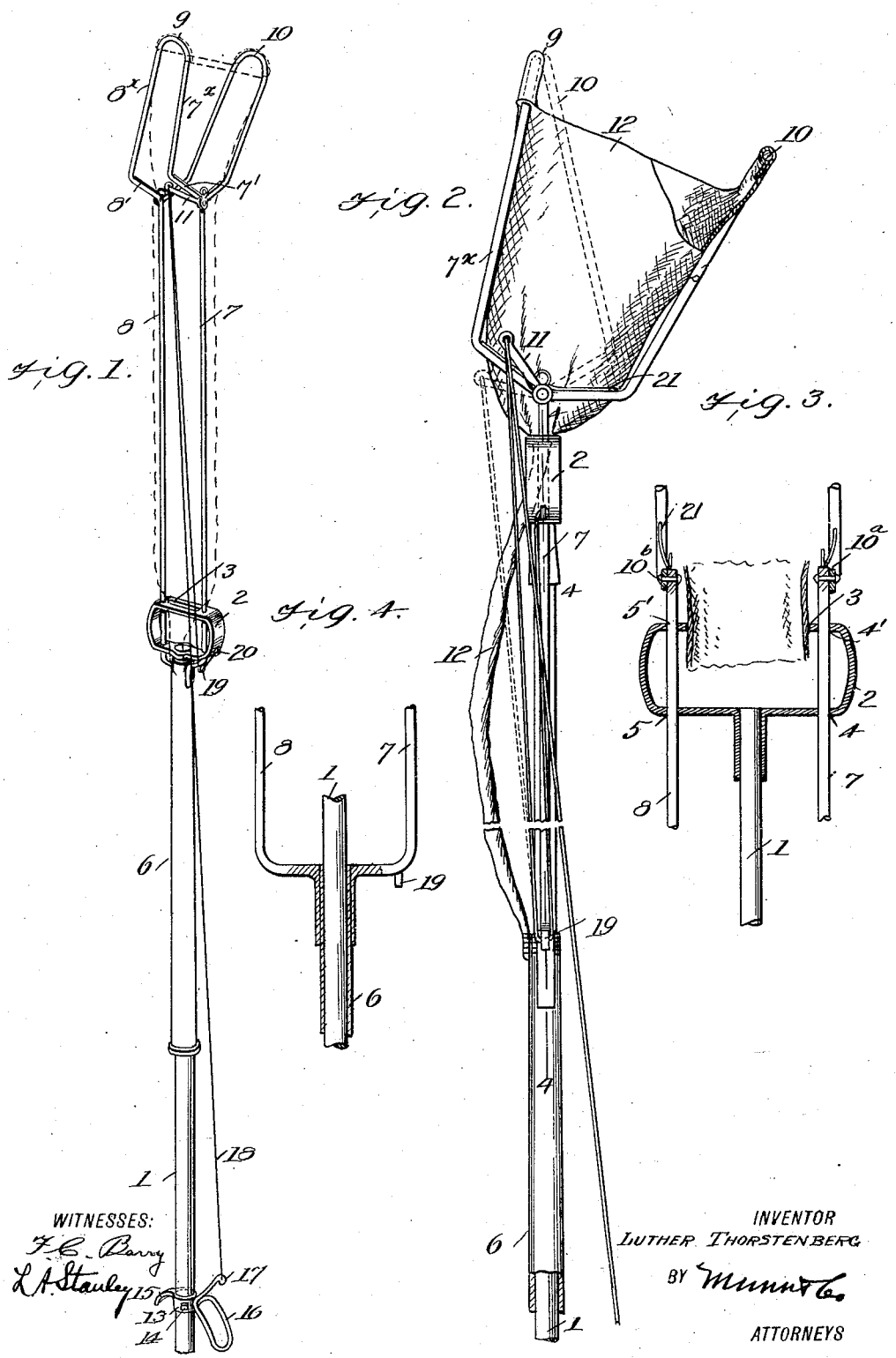

LUTHER THORSTENBERG, OF McMINNVILLE, TENNESSEE.

FRUIT-PICKER.

978,791.

Specification of Letters Patent.    Patented Dec. 13, 1910.

Application filed May 9, 1910. Serial No. 560,201.

*To all whom it may concern:*

Be it known that I, LUTHER THORSTENBERG, a citizen of the United States, and a resident of McMinnville, in the county of Warren and State of Tennessee, have made certain new and useful Improvements in Fruit-Pickers, of which the following is a specification.

My invention relates to improvements in devices for picking fruit, and it consists in the constructions, combinations and arrangements herein described and claimed.

An object of my invention is to provide improved devices by means of which fruit may be picked without being bruised. To this end I arrange a flexible holder whose capacity may be varied as the fruit is picked, thereby obviating the necessity of dropping the fruit to any distance and incurring the liability of bruising it.

A further object of my invention is to provide means for emptying the holder without the danger of bruising the fruit.

A further object of my invention is to provide a device having a carrier or holder into which the fruit is deposited, by a simple movement of the frame comprising the upper part of the holder itself.

Other objects and advantages will appear in the following specification and the novel features of the device will be particularly pointed out in the appended claims.

My invention is illustrated in the accompanying drawings in which—

Figure 1 is a perspective view, showing the device with the holder removed, Fig. 2 is a detail view showing the means for operating the jaws of the holder, Fig. 3 is a view partly in section, showing the loop at the end of the main handle member, and Fig. 4 is a detail view partly in section showing the sliding rods and the sleeve for operating the same.

In carrying out my invention, I provide a main handle portion 1, of wood or other suitable material. To the top of this handle portion is secured a loop of metal, 2. This loop is provided with a central slot 3, and openings 4 and 4' and 5 and 5' for purposes hereinafter indicated.

Arranged to slide on the main handle member 1 is a thin metal sleeve 6, to which is secured, at its upper end, the rods 7 and 8. The rod 7 passes through the openings 4 and 4' in the loop 2, while the rod 8 passes through the openings 5 and 5' in the loop. The upper end of each of the rods 7 and 8 are bent at an angle, as shown at 7' and 8' in Fig. 1, and then are bent back to form the portions $7^x$ and $8^x$. The portions $7^x$ and $8^x$ are in turn joined by a curved integral portion 9.

Pivotally connected to the rods 7 and 8 at $10^a$ and $10^b$ is a loop 10 of similar form to the bent portions 7', 8' $7^x$, $8^x$ and 9, and forming therewith an opposing jaw. The loop 10 is provided with an extended portion 11 on one side to form a lever for manipulating the jaws, *i. e.* for swinging the jaw 10 against jaw 9.

The holder consists of a sack 12 whose upper end is secured to the members 9 and 10. The sack extends downwardly between the rods 7 and 8 and through the central slot 3 of the loop 2, being secured to the sleeve 6.

In order to manipulate the jaws 9 and 10, I provide the ring 13, which is adjustably secured to the handle by means of a set screw 14. The ring is provided with a thumb hook 15 on one side and on the other side with a pivoted hand loop 16, having an extension 17 to which a cord 18 is attached. This cord passes upwardly through an eye in the lever 11, thence downwardly through a ring 19 of the lower end of the rod 7, and is attached to the loop 2 at 20.

From the foregoing description of the various parts of the device the operation thereof may be readily understood.

In beginning the operation of picking, the sleeve 6 is drawn downwardly until the loop 2 is a short distance from the pivot of the jaw 10, as shown in Fig. 2. The handle is raised until the jaws envelop the fruit, whereupon the pivot member 16 is pressed against the handle portion 1, the fingers being inserted through the loop 16 and the thumb being placed under the thumb flange 15. This pulls downwardly on the cord 18 and on the lever 11 thereby throwing the jaw 10 in the dotted line position, shown in Fig. 2. A slight pull now detaches the fruit, which falls into the holder 12, which is, preferably, a canvas sack. This operation may be repeated until the holder becomes nearly full. Now, by pushing upwardly on the sleeve 6 with one hand, the length of the holder will be increased, since the sack will be pulled through the slot 3 in the loop 2. It will be seen that the fruit will descend as far as it can, that is, until it reaches the member 2 and as fast as the fruit is picked the sleeve may be elevated and the holder lengthened. This, it will be seen, permits the fruit to fall only a short distance, thereby preventing the bruising of the fruit. When the sack or holder is filled the cord 18 may be pulled so as to close the jaws and the device may be lowered without spilling the fruit. The jaws may be placed at a suitable point for depositing the fruit and then by simply pulling the sleeve toward the operator, the fruit will be forced out of the opening at the end of the sack, (the jaws having been previously released.) This again prevents the fruit from falling and being bruised. In order to bring the jaws into their normally distended position, I provide the spring 21.

The picker described above is comparatively light in weight and obviates the necessity of lowering the device to the place where the fruit is to be deposited each time after the fruit is picked. The adjustable holder, I consider, one of the main features of my invention, since it may be readily seen that with a holder of this kind the danger of bruising the fruit by a long fall is entirely obviated.

In the use of my improved device, a fruit picker, who is up in a tree, does not have to descend to empty the receptacle, thus saving time in descending and ascending to empty each load. If the operator is standing on a box or a ladder, while using my improved picker, he can deliver the fruit on the ground, without stooping down. This is accomplished in the manner described above, by closing the jaws, so as to prevent the fruit from spilling out, then lowering the device and opening the jaws so as to permit the fruit to escape.

I claim:

1. In a fruit picker, a handle, a sleeve slidably mounted on said handle, a pair of jaws carried by said sleeve, means for operating the jaws, a sack having its opened end secured to the jaws and the lower end secured to said sleeve, and a loop carried by said handle provided with a slot through which the sack extends.

2. In a fruit picker, a handle, a pair of jaws, a cord and lever for operating the jaws, a sack having its open end secured to the jaws, a loop carried by said handle provided with openings and a slot through which the flexible holder extends, a sleeve slidably mounted on said handle to which the lower end of the sack is secured, a pair of rods secured to said sleeve and arranged to pass through said holder, one of said jaws being integral with said rods and the other of said jaws being pivoted to said rods.

3. In a fruit picker, a main handle provided with an adjustable hand lever, a loop secured at the upper end of said main handle, said loop having a slot and openings, a sleeve slidably mounted on said handle, a pair of rods secured to said sleeve and terminating at their upper ends in an integral jaw, one of said rods being provided with a ring, said rods passing through said openings in said loop, a second jaw pivoted to said rods and provided with an extension, a cord fastened to said adjustable lever on said handle and passing through the eye in the extension on said jaw, thence downwardly through said ring and being secured to said lever, and a flexible bag having its open end secured between said jaws, the body of the bag passing through said slot in said loop and being secured to said sleeve.

LUTHER THORSTENBERG.

Witnesses:
 HOWARD A. ROCKWOOD,
 W. A. SULLIVAN.